United States Patent [19]
Bourekas et al.

[11] Patent Number: 5,317,711
[45] Date of Patent: May 31, 1994

[54] STRUCTURE AND METHOD FOR MONITORING AN INTERNAL CACHE

[75] Inventors: Philip A. Bourekas, San Jose; Yeshayahu Mor, Cupertino; Scott Revak, Castro Valley, all of Calif.

[73] Assignee: Integrated Device Technology, Inc., Santa Clara, Calif.

[21] Appl. No.: 715,526

[22] Filed: Jun. 14, 1991

[51] Int. Cl.$^5$ ............................................. G01R 31/28
[52] U.S. Cl. .................................. 395/425; 371/22.5; 371/29.5
[58] Field of Search .................. 371/22.1, 22.3, 22.5, 371/29.5, 16.1; 324/158 R; 395/425

[56] References Cited

U.S. PATENT DOCUMENTS

| | | |
|---|---|---|
| 4,190,885 | 2/1980 | Joyce et al. |
| 4,438,490 | 3/1984 | Wilder, Jr. |
| 4,686,621 | 8/1987 | Keeley et al. |
| 4,821,178 | 4/1989 | Levin et al. |
| 4,935,929 | 6/1990 | Sidman et al. ............ 371/22.3 |
| 4,967,387 | 10/1990 | Shibasaki et al. |
| 4,991,090 | 2/1991 | Emma et al. |
| 5,012,180 | 4/1991 | Dalrymple et al. ............ 381/22.1 |

OTHER PUBLICATIONS

*Structured Computer Organization* Third Edition by Andrew S. Tanebaum ©1990 by Prentice-Hall, Inc. pp. 126–131 and 165.
*Advanced Microprocessors* by Daniel Tabak ©1991 by McGraw-Hill, Inc. pp. 275–309 and Appendices 4.A, 4.B and 4.C.

Primary Examiner—Vincent P. Canney
Attorney, Agent, or Firm—Skjerven, Morrill, MacPherson, Franklin & Friel

[57] ABSTRACT

A structure and a method are provided to bring internal signals of an integrated circuit to the external pins for monitoring purpose. In one embodiment, the signals on an internal bus between an on-chip cache and a CPU in a microprocessor are provided on the microprocessor's pins for a bidirectional data/address bus, when the bidirectional data/address bus is not used for data/address bus transactions with the main memory or the peripheral input/output devices. In this embodiment, reserved pins are used to selectively enable the address/data bus for bringing out the signals of the on-chip bus.

14 Claims, 6 Drawing Sheets

STRUCTURE AND METHOD FOR MONITORING AN INTERNAL CACHE

FIELD OF THE INVENTION

This invention relates to integrated circuits, and in particular, relates to the design of microprocessors.

DESCRIPTION OF RELATED ART

Exploiting the property of locality of memory references, cache memories have been successful in achieving high performance in many computer systems In the past, cache memories of microprocessor-based systems are provided off-chip using high performance memory components. This is primarily because the amount of silicon area necessary to provide an on-chip cache memory of reasonable performance would have been impractical, since increasing the size of an integrated circuit to accommodate a cache memory will adversely impact the yield of the integrated circuit in a given manufacturing process. However, with the density achieved recently in integrated circuit technology, it is now possible to provide on-chip cache memory economically.

In a computer system with a cache memory, when a memory word is needed, the central processing unit (CPU) looks into the cache memory for a copy of the memory word. If the memory word is found in the cache memory, a cache "hit" is said to have occurred, and the main memory is not accessed. Thus, a FIGURE of merit which can be used to measure the effectiveness of the cache memory is the "hit" ratio. The hit ratio is the percentage of total memory references in which the desired datum is found in the cache memory without accessing the main memory. When the desired datum is not found in the cache memory, a "cache miss" is said to have occurred and the main memory is then accessed for the desired datum. In addition, in many computer systems, there are portions of the address space which are not mapped to the cache memory. These portions of the address space are said to be "uncached" or "uncacheable". For example, the addresses assigned to input/output (I/0) devices are almost always uncached. Both a cache miss or an uncacheable memory reference result in an access to the main memory.

In the course of developing or debugging a computer system, it is often necessary to monitor program execution by the CPU or to interrupt one instruction stream to direct the CPU to execute certain alternate instructions. For example, a technique for testing a microprocessor in a system under development uses an in-circuit emulator (ICE) which monitors the instruction stream and, where appropriate, takes control of the microprocessor by forcing the microprocessor to execute an alternative program. To achieve this end, the ICE monitors the signals on the microprocessor's pins. When a monitored instruction in the program execution is encountered, the ICE causes alternative instructions to be executed for such purpose as reading or altering the internal state of the CPU. Hence, when the cache memory is implemented off-chip, the transactions between the cache memory and the CPU can be monitored by the ICE via the microprocessor's pins on the off-chip bus between the cache memory and the CPU. However, when the cache memory is implemented on-chip, the transactions between the cache and the CPU occur on an internal on-chip bus, which cannot be probed from the pins of the integrated circuit. As a result, debugging operations using an ICE in a system with an on-chip cache memory can be very difficult. When the on-chip cache memory achieves a high hit ratio, only the relatively infrequent accesses to main memory due to cache misses or references to uncacheable portions of memory can be monitored from the pins.

In the prior art, to provide a way for the ICE to monitor execution of the instruction stream, or to introduce alternative instructions into the CPU, designers of microprocessors with on-chip cache memory often provide means for disabling the on-chip cache, so that every instruction can be monitored from the off-chip bus between the main memory and the microprocessor. Debugging under a disabled cache, however, is a condition which does not reflect the intended operation of the microprocessor. Consequently, considerable overhead, which is especially undesirable for testing real time applications, is introduced into program execution. For such applications, it is often necessary to use, for example, a technique called a "shadow cache," i.e. an externally implemented cache memory which mirrors identically the operation of the on-chip cache. A technique such as shadow cache requires both expensive hardware and complex software.

SUMMARY OF THE INVENTION

A structure and a method are provided to bring the internal signals of an integrated circuit to the external pins for monitoring purpose. In one embodiment, the signals on an internal bus between an on-chip cache and a CPU in a microprocessor are provided on the microprocessor's pins for a bidirectional data/address bus, when the bidirectional data/address bus is not used for data/address bus transactions with the main memory or the peripheral input/output devices. When the bidirectional data/address bus is providing the signals on the internal bus, the output control signals which the microprocessor provides to the main memory or the peripheral input/output devices are disabled. In this embodiment, reserved pins are used to selectively enable the address/data bus to bring to the external pins the signals on the internal bus.

The present invention allows testing equipment to monitor internal signals of an integrated circuit, such as the signals on an internal bus between an on-chip cache memory and a CPU in a microprocessor, using the external pins of the integrated circuit. The present invention supports standard testing equipment such as a logic analyzer or an in-circuit emulator, without the use of techniques such as "shadow caches", and thereby obviates the need of expensive hardware, or complex software techniques for monitoring such internal signals. In addition, because internal caches need not be disabled, the present invention allows testing of the integrated circuit under conditions closer to real time applications than previously attained by the prior art. The present invention is better understood upon consideration of the below detailed description and the accompanying drawings.

BRIEF DESCRIPTION OF THE DRAWINGS

FIG. 1b is a block diagram of the processor 101 of FIG. 1a.

DETAILED DESCRIPTION OF THE PREFERRED EMBODIMENTS

Figure 1A:
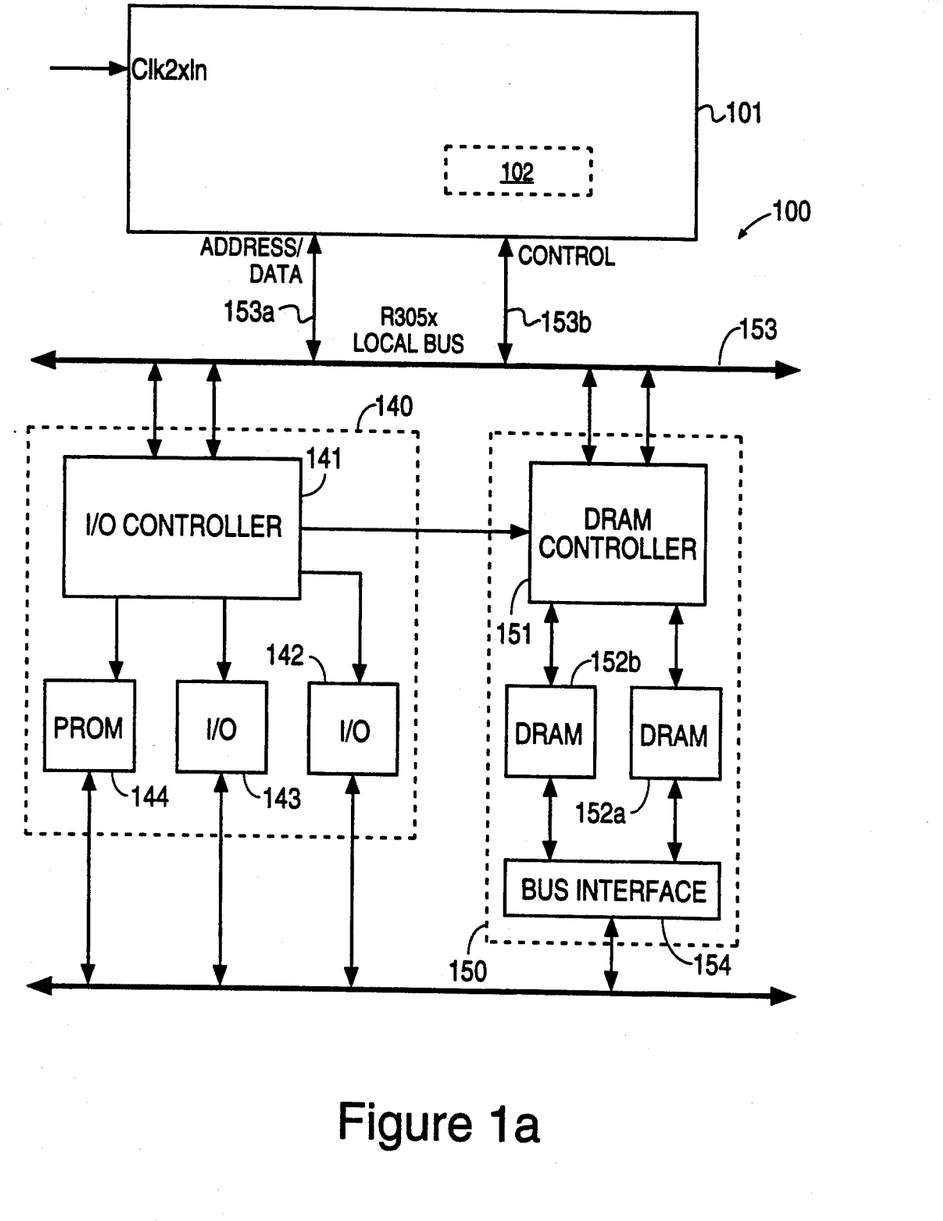
FIG. 1a shows a computer system 100 having a processor 101 with an on-chip instruction cache system 102 and a main memory system 150 external to the processor 101, in accordance with the present invention.

FIG. 1a shows, as an example, a computer system 100 having a processor 101 with an on-chip cache system 102 and a main memory system 150 external to the processor, in accordance with the present invention. As shown in FIG. 1a, external or read and write memory ("main memory") system 150, which is interfaced to the processor 101 over a bus 153, comprises a dynamic random access memory (DRAM) controller 151, a main memory 152 implemented by banks 152a and 152b of DRAMs and a bus interface 154. In addition, the address space of computer system 100 is also used to access other memory-mapped devices such as I/O controller 141, I/O devices 142 and 143, and programmable read-only memory (PROM) 144. To facilitate reference, the memory mapped devices other than the main memory 150 defined above are collectively referred to as the I/O system 140, even though read-only memories such as PROM 144 are often not considered part of the I/O system. I/O system 140 is also interfaced to the bus 153. Bus 153 comprises address/data bus 153a and control bus 153b. Memory data and memory addresses are time-multiplexed on the 32-bit address/data bus 153a. Other devices configurations using the memory address space are also possible within the scope of the present invention.

Figure 1B:
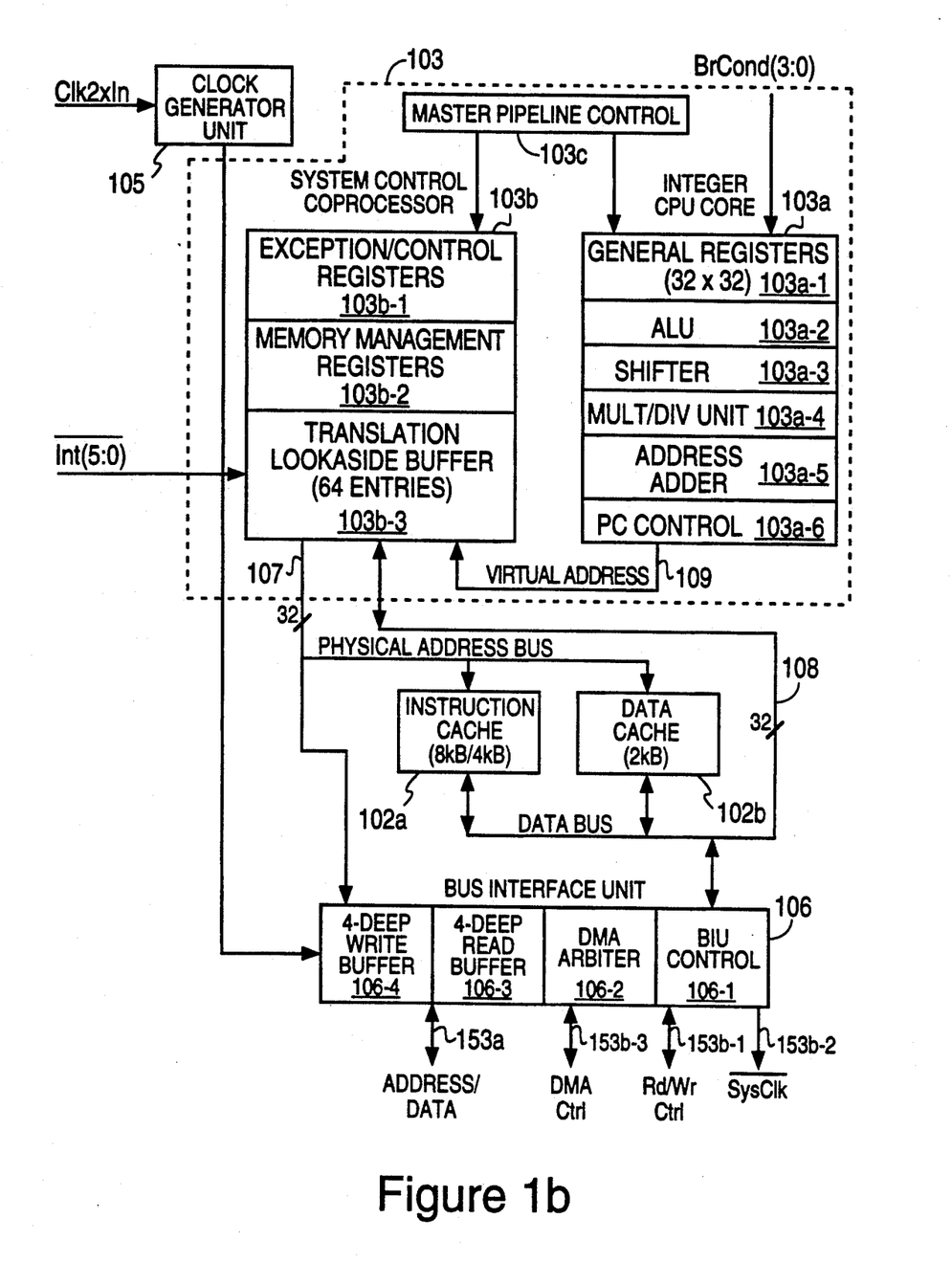

The organization of processor 101 is shown in FIG. 1b. As shown in FIG. 1b, processor 101 includes two coprocessors 103a and 103b, controlled by a master pipeline control unit 103c. Coprocessor 103a is also referred to as the integer CPU, and includes 32 32-bit general registers 103a-1, an ALU 103a-2, a shifter 103a-3, a multiplication and division unit 103a-4, an address adder 103a-5, and program counter control unit 103a-6. Processor 103a executes the instruction set known as the MIPS-I Instruction Set Architecture (ISA). Coprocessor 103b, also known as the System Control Coprocessor, comprises exception/control registers 103b-1, a memory management registers unit 103b-2 and a translation look-aside buffer (TLB) 103b-3. The TLB unit 103b-3 provides a mapping between virtual and physical addresses. The TLB unit 103b-3 has a 64-entry look-up table to provide mapping between virtual and physical addresses efficiently. In this embodiment, the TLB unit 103b-3 is provided at the user's option. The TLB unit 103b-3 can be disabled. The above units of the coprocessors 103a and 103b can be implemented by conventional or any suitable designs known in the art. The coprocessor units 103a and 103b, and the pipeline control unit 103c are collectively referred to as the CPU core 103.

The cache system 102 of processor 101 comprises two cache memories 102a and 102b. Cache 102a is an instruction cache. In this embodiment shown, the capacity of cache 102a can be 4K or 8K bytes, and line and block refill sizes of four memory words each. Cache 102b is a data cache, and has a selectable block refill size of one or four memory words, a line size of one memory word, and a capacity of 2K bytes. Other cache, line and block refill sizes can be provided without departing from the scope of the present invention. Both the capacities of cache 102a and cache 102b, and their respective block refill and line sizes, are matters of design choice. In addition, it is also not necessary to provide separate data and instruction caches. A joint data and instruction cache is also within the scope of the present invention. The TLB unit 103b-3 receives from the CPU core 103 on bus 109 a virtual address and provides to either cache 102a or cache 102b on bus 107 the corresponding physical memory address. Although cache accessing using virtual addresses is also possible, by using physical addressing in the instruction and data caches, the present embodiment simplifies software requirements and avoids the cache flushing operations necessary during a context switch in a virtual addressed cache. The cache addressing scheme is discussed below in conjunction with FIG. 2.

Bus interface unit (BIU) 106 interfaces processor 101 with the main memory 150 when a read or write access to main memory is required. BIU 106 comprises a 4-deep write buffer 106-4, a 4-deep read buffer 106-3, a DMA arbiter 106-2 and BIU control unit 106-1. BIU control unit 106-1 provides all control signals on bus 153b, which comprises buses 153b-1 to 153b-3 necessary to interface with the main memory 150 and the I/O system 140. Both addresses and data are multiplexed on the address/data bus 153a, and the control signals are provided on the $\overline{\text{Rd}}/\overline{\text{Wr}}$ control bus 153b-1, the system clock signal 153b-2, and the DMA control bus 153b-3.

$\overline{\text{Rd}}/\overline{\text{Wr}}$ control bus 153b-1 comprises pins Addr[3:2], which provides the least significant two bits of a memory word address, interface control signals $\overline{\text{Rd}}$ (read), $\overline{\text{Wr}}$ (write), $\overline{\text{DataEn}}$ (data enable), $\overline{\text{Burst}}/\overline{\text{WrNear}}$ (burst mode or "Write Near") and $\overline{\text{ALE}}$ (address latch enable), and diagnostic signals Diag[1:0]. The DMA control bus 153b-3 comprises DMA control signals on pins $\overline{\text{BusGnt}}$ (bus grant) and $\overline{\text{BusReq}}$ (bus request). The functions and protocols of the signals in busses 153b-1 and 153b-3 are described in "IDT79R3051 ™ Family Hardware User's Manual", which is available from Integrated Device Technology, Inc., Santa Clara, Calif., and which is hereby incorporated by reference in its entirety. The data/address bus 153a comprises pins AD[31:0] which is multiplexed for sending address to the main memory 150 and for sending or receiving data to and from the main memory 150.

Figure 2:
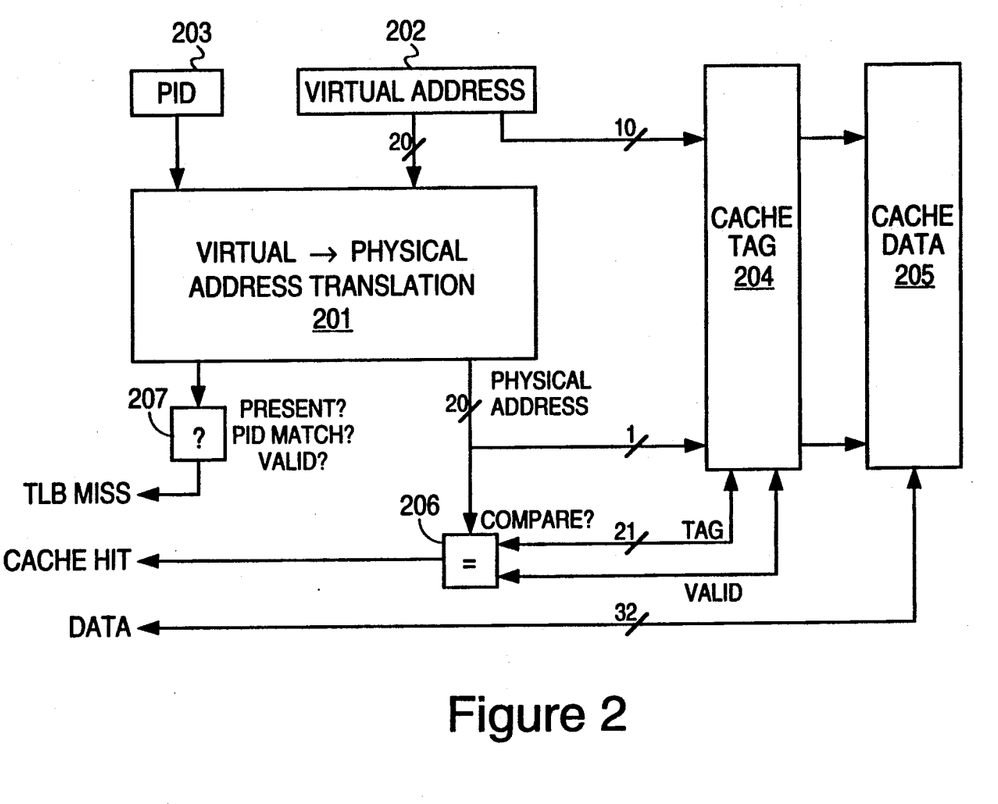
FIG. 2 is a block diagram showing the addressing scheme used in instruction cache 102a of the cache system 102 of FIG. 1a and 1b.

FIG. 2 is a block diagram showing the addressing scheme used in the instruction cache 102a of the cache system 102, which is shown in FIGS. 1a and 1b. As shown in FIG. 2, the higher order 20 bits of a virtual address (generated by CPU core 103, as shown in FIG. 1b), which is represented by block 202, is provided to the cache addressing mechanism represented by block 201. The remaining 10 bits of the memory word address are common between the virtual and the physical addresses. (The lowest two bits are byte addresses, which are not used in cache addressing.) These ten common bits are directly provided to index into the cache memory 102a, represented by blocks 204 and 205. Block 205 represents the data portion of the cache line, which comprises four 32-bit memory words in this embodiment. Block 204 represents the "tag" portion of the cache data word; this tag portion contains both a "valid" bit and the higher order 20 bits of the memory word addresses of the data words stored in the cache line. (Since the addresses of memory words within the cache line are contiguous, the higher order 20 bits are common to all of the memory words in the cache line). The valid bit indicates that the cache word contains valid data. Invalid data may exist if the data in the cache does not contain a current memory word. This condition may arise, for example, after a reset period.

Each virtual address is associated with a particular process identified by a unique "process id" PID, which is represented by block 203. Block 201 represents the virtual address to the physical address translation, which is performed using the TLB unit 103b-3 when the TLB is present. (FIG. 1b.) When the TLB is present, a TLB miss occurs if either a mapping between the virtual address and the corresponding physical address cannot be found in the 64 entries of the TLB unit 103b-3, the PID stored in the TLB unit 103b-3 does not match the PID of the virtual address, or if the valid bit in the data word is not set. Block 207 represents the determination of whether a TLB miss has occurred. The TLB miss condition raises an exception condition, which is handled by CPU core 103. If a virtual address to physical address mapping is found, the higher order 20 bits of the physical memory word address is compared (block 206) with the memory address portion of the tag. The valid bit is examined to ensure the data portion of the cache line contains valid data. If the comparison (block 206) indicates a cache hit, the selected 32-bit word in the cache line is the desired data.

If a cache miss is indicated, BIU 106 is invoked and CPU core 103 stalls until BIU 106 indicates that the requested data is available. A cache miss can also be generated when the memory access is to a "uncacheable" portion of memory. When BIU 106 receives a datum from main memory, the CPU core 103 executes either a "refill", a "fix-up", or a "stream" cycle. In a refill cycle, an instruction datum received (in the read buffer 106-3) is brought into the cache 102a. In a fix-up cycle, the CPU core 103 transitions from a refill cycle to execute the instruction brought out of the read buffer 106-3. In a stream cycle, the CPU core 103 simultaneously refills cache memory 102a and executes the instruction brought out of the read buffer 106-3. For uncacheable references, the CPU core 103 executes a fixup cycle to bring out the fetched memory word from the read buffer 106-3, but the uncacheable memory word is not brought into the cache memory 102a. Otherwise, the CPU core 103 executes refill cycles until the miss address is reached. At that time, a fixup cycle is executed. Subsequent cycles are stream cycles until the end of the 4-memory word block is reached and normal run operation resumes. If sequential execution is interrupted, e.g. a successful branch condition, refill cycles are executed to refill the cache before execution is resumed at the branch address.

The operation of the data cache 102b is similar to that of instruction cache 102a, except that only one fixup cycle is used after one or four refill cycles, depending upon the refill block size selected. Because the size of the data cache is 2k-bytes, a 21-bit "tag" is required. Hence, because of the different sizes of the instruction and data caches, the data cache's tag is larger than the instruction cache's tag by one bit. In order to have the data and instruction caches share a common cache addressing scheme, the instruction cache routes one of the lower order address bits back as a tag bit, so as to appear as if the tag portion of the instruction cache is 21-bit wide.

Figure 3:
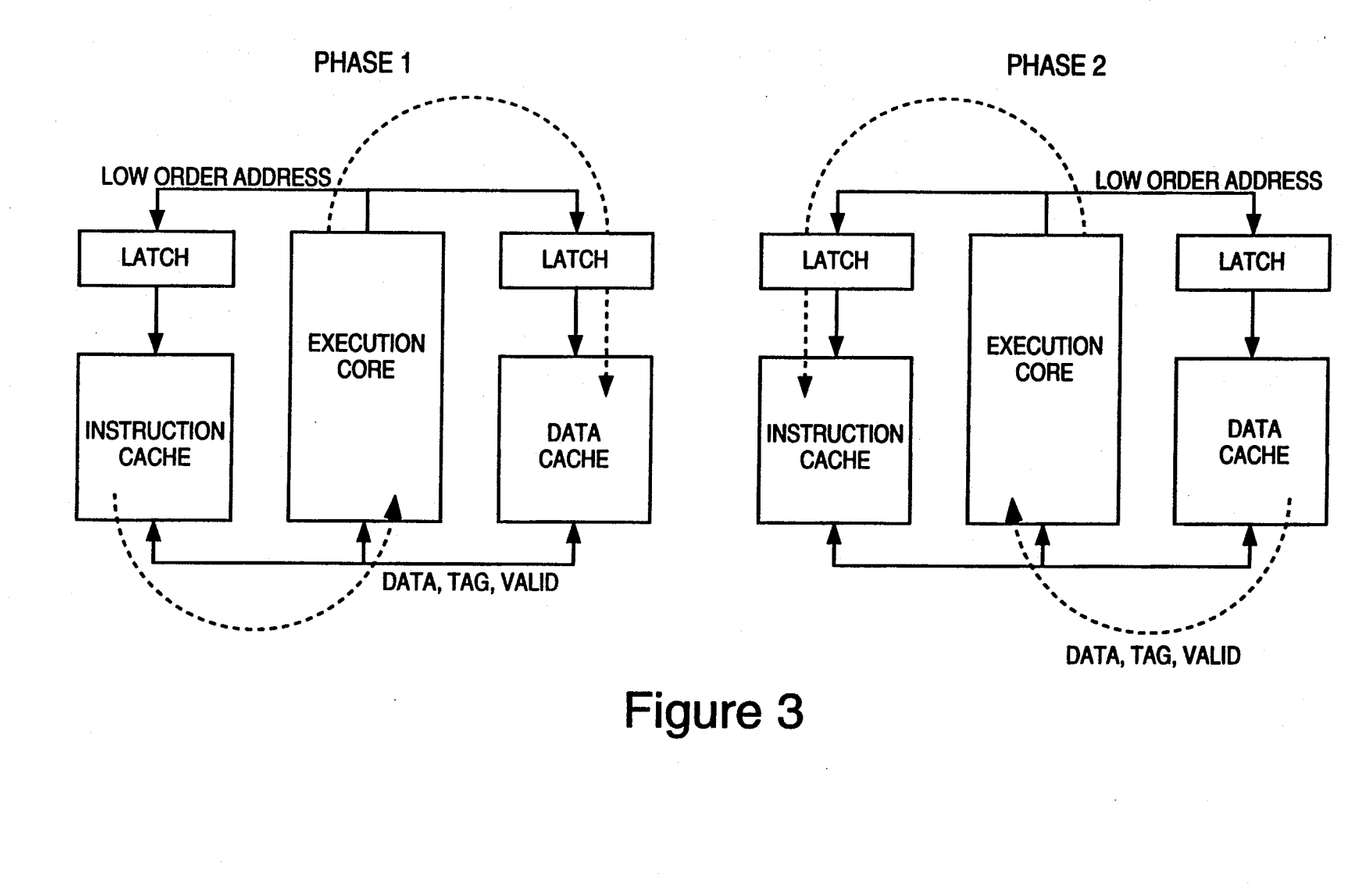
FIG. 3 shows a "run" cycle of the CPU core 103.

The execution of an instruction in the CPU core 103 is called a "run" cycle. The run cycle, which comprises two phases, is illustrated by FIG. 3. As shown on the left hand side of FIG. 3, during the first phase ("data phase"), a data cache (cache 102b) address is presented and a previous instruction cache (cache 102a) read is completed. During the second phase (the "instruction" phase), data found resident at the data cache address presented in the first phase is read into the CPU core 103, and an address corresponding to the next instruction is issued to instruction cache 102a.

Figure 4:
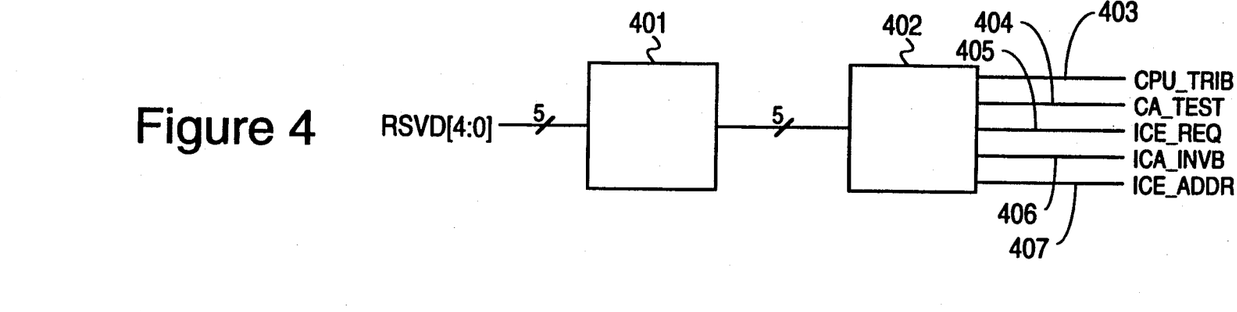
FIG. 4 shows a circuit 400 receiving input signals RSVD[0:4] into processor 101 of FIGS. 1a and 1b; circuit 400 provides an internal signal ICE_ADDR indicating monitoring of internal bus 108 is desired.

In this embodiment, processor 101 is further provided with five "reserved pins" RSVD[4:0], for receiving five signals used for testing purposes. FIG. 4 shows the signal on each of the pins RSVD[4:0] being received by input buffers 401, which is decoded by decoding logic 402 into five signals 403-407, respectively labelled CPU_TRIB, CA_TEST, ICE_REQ, ICA_INVB, and ICE_ADDR. In this embodiment, when the signal on the RSVD[2] pin is logic high, and the signals on the RSVD[3:4] pins are at logic low, the processor 101 is said to be in "debug" mode. In debug mode, the ICE_ADDR signal is asserted. Furthermore, the ICE_INVB signal is asserted if the signal on the RSVD[1] pin is also asserted during debug mode. The ICE_ADDR signal on terminal 407, which is asynchronous, indicates that echoing the signals on internal bus 108 between the CPU core 103a and the caches 102 is desired. The ICE_INVB signal on terminal 406, which is synchronized with respect to clock signals SysClk, SysOut1 and SysOut2 and their respective complementary signals, indicates that a forced cache miss is desired. A forced cache miss is used to allow an external testing device, such as an ICE, to "jam" an instruction into the CPU core. The forced cache miss mechanism is described on copending Application entitled "Hardware Control Method for Monitoring an On-chip Internal Cache in a Microprocessor", by P. Bourekas et al, U.S. Ser. No. 07/715,525 filed Jun. 14, 1991 and which is hereby incorporated by reference in its entirety. The ability to monitor internal bus signals and the ability to force execution of alternative instructions are important features necessary to support the use of testing and debugging devices, such as an ICE.

When the ICE_ADDR signal is asserted, the signals on internal bus 108 are echoed on the output bus 153a (FIG. 1a), when the address/data bus 153a is idle. The address/data bus 153a is idle when neither read (e.g. a cache miss, or an uncacheable reference), write or DMA operations to the main memory are using the address/data bus 153a. In order to prevent the echoed signals on the internal bus 108 from being mistaken by the main memory as a request for read or write, the ALE (Address latch enable) signal of the $\overline{Rd/Wr}$ control bus 153b-1 (FIG. 1b) is disabled. Thus, to latch the signals on address/data 153a, an external circuit should use the rising edge of the clock signal SysClk.

Figure 5:
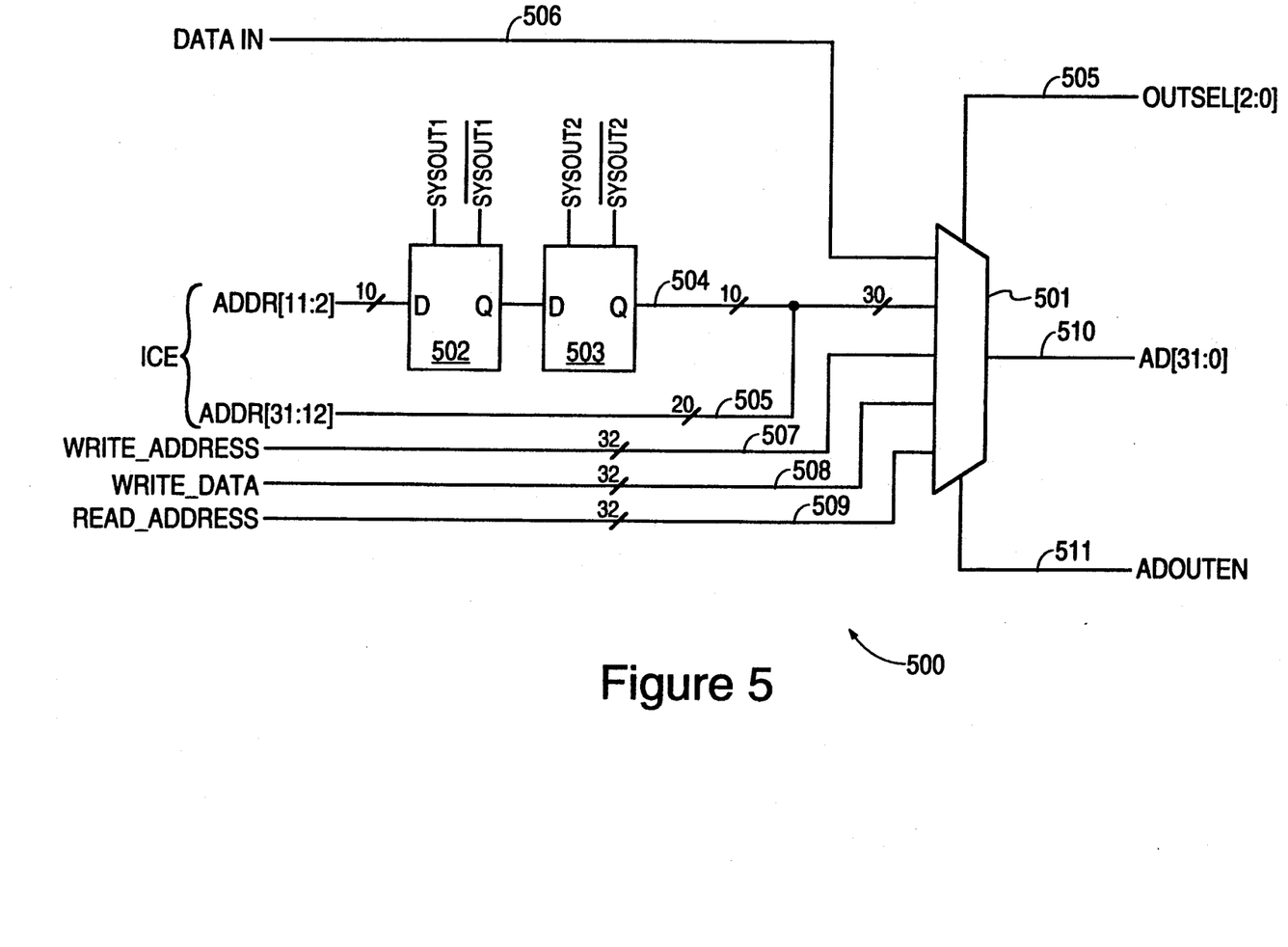
FIG. 5 is a block diagram showing a multiplexor 501 in processor 101 selecting from several sources of output data the addresses provided to the cache memory 102 on the internal bus 108 between the cache memory 102 and the CPU core 103, in accordance with the present invention.

FIG. 5 shows a multiplexor 501 in the bus interface unit 106 of the processor 501. As shown, the multiplexor 101 selects to output on bus 153a (pins AD[31:0] represented by the terminals 510) from one of several sources: write and read addresses from CPU core 103 (represented by busses 507 and 509 respectively labelled "read_address" and "write_address"), the data to be written (represented by bus 508 labelled "write_data"), which is held in write data buffer 106-4, the data read (represented by bus 506 labelled "data_in"), which is held in the read buffer 106-3, or the signals represented by the 30-bit bus 504, which is represented by the combination of 10-bit bus 504a and 20-bit bus 504b. The signals on bus 504 are the internal signals of bus 108 echoed under debug mode.

From the description of the run cycle above in conjunction with FIGS. 2 and 3, the person of ordinary skill in the art will appreciate that in the instruction phase (the second phase) of a run cycle, the least significant 10 bits of the memory address of the next instruction are used to address the instruction cache. The 8 higher bits of these 10 bits locate the tag. In the first phase of the next run cycle, a 22-bit tag is returned by the instruction cache. As discussed above, the 22-bit tag comprises the higher 20 bits shared by the addresses of the four memory words stored in the cache line, are lower address bit, and a "valid" bit. Hence, a memory word address corresponding to a cache "hit" can be constructed from concatenating the least significant 10 bits, which are used to address the instruction cache, and the 20-bit address portion of the tag returned. Therefore, FIG. 5 shows capturing 10 bits of the lower address bits Addr[11:2] (represented by bus 504a in FIG. 5) on internal bus 108 half clock cycle prior to capturing the 20-bit address portion (represented by bus 504b in FIG. 5) of the tag returned. FIG. 5 shows that the timing for capturing the lower 10 bits Addr[11:2] of the address can be achieved by synchronizing the data in the address phase of the run cycle to clock signals SysOut1 and SysOut2. For output purpose, the 20-bit tag (Addr[31:12]) is output on bus 153a by the pins AD[31:12], bits Addr[11:4] are output on bus 153a by the pins AD[11:4]. Addr[3:2] are output on control signal pins Addr[3:2] of Rd/Wr control bus 153b-1.

Figure 6:
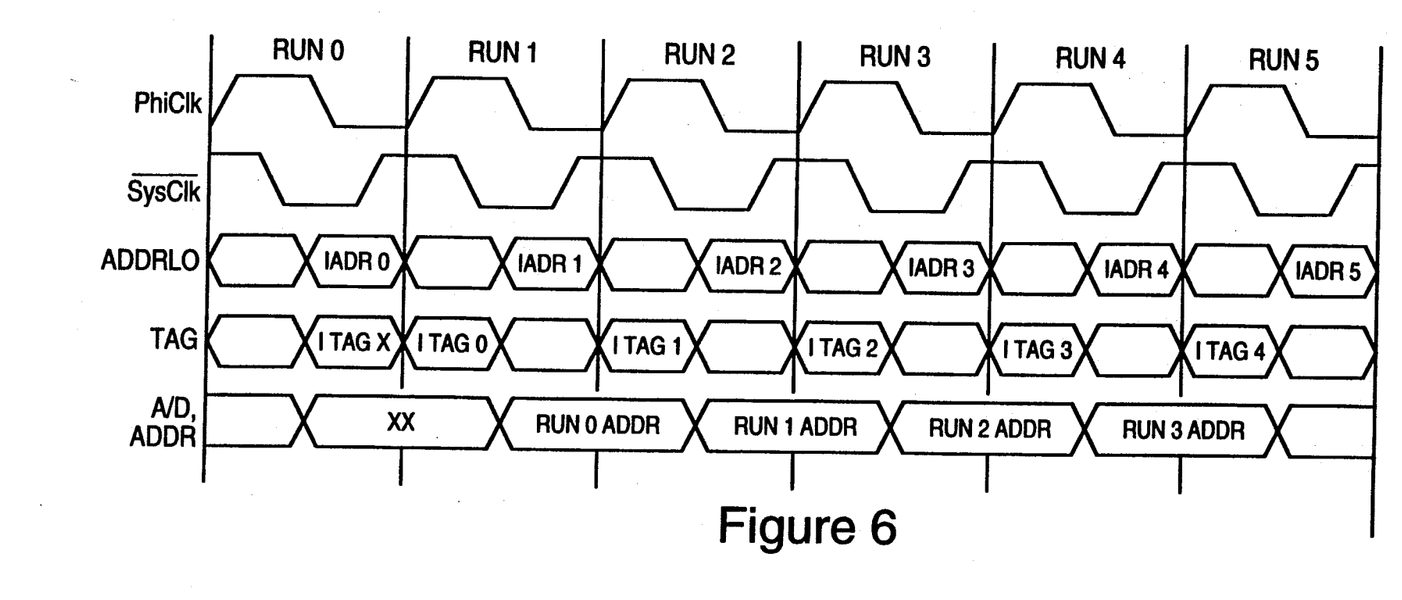
FIG. 6 is a timing diagram showing the capturing of the lower 10 bits of an address supplied to a cache memory and the corresponding tag returned during the address and data phases of the processor clock signal, in each of four "run" cycles.

FIG. 6 shows the timing relationships in capturing the lower address bits and the corresponding address tag returned in four run cycles (Run 0 - Run 3), and displaying the captured address on the address/data bus 153a.

The address display mode is intended to allow gross, rather than fine instruction trace by a testing device, such as an ICE. For example, branch instruction executed while bus 153a is engaged in a DMA transaction will not be traceable. Additionally, data echoed may not be valid when CPU core 153a stalls, such as when a TLB miss occurs.

The above detailed description is provided to illustrate the specific embodiments provided above, and not intended to be limiting the present invention. Many modifications and variations within the scope of the present invention are possible. The present invention is defined by the following claims.

We claim:

1. A structure for monitoring internal signals of a microprocessor having a plurality of pins for outputting data signals, said structure comprising:

a first circuit for receiving an external control signal having an active state, said active state indicating monitoring of said internal signals is desired;

a second circuit, coupled to receive said external control signal, for providing said internal signals to said pins in response to said external control signal; and a third circuit for indicating that said internal signals are provided on said output pins, said third circuit providing an indicating signal on a control signal pin, said indicating signal indicating, when said external control signal is in said active state, whether internal signals or data signals are provided on said plurality of pins.

2. A structure as in claim 1, wherein said plurality of pins form a data bus for communicating with a main memory, and wherein said control signal pin is also used, when said internal signals are not provided on said plurality of pins, for transmitting a control signal to said main memory.

3. A structure as in claim 2, wherein said microprocessor comprises:

a processing unit;

a cache memory;

an internal bus, coupling said processing unit nd said cache memory, for data transfer between said processing unit and said cashe memory; and a memory buffer, coupled to said processing unit, for accessing an external main memory;

wherein said second circuit comprises a multiplexor, coupled to provide output signals on said plurality of pins, for selecting between signals on said internal bus for cache access, and output signals of said buffer.

4. A structure as in claim 3, wherein said bus multiplexes data and address signals when not used for providing said internal signals.

5. A method for monitoring internal signals of a microprocessor having a plurality of pins for providing, under control of a processing unit of said microprocessor output signals of said microprocessor, comprising:

receiving an external control signal at an input pin of said integrated circuit indicating monitoring of said internal signals is desired; and when (i) said external signal is asserted and (ii) said output signals of said microprocessor are not provided on said plurality of pins:

providing said internal signals to said plurality of pins; and indicating that said internal signals are provided on said plurality of pins.

6. A method as in claim 5, wherein said plurality of pins form a data bus for said microprocessor to communicate with a main memory.

7. A method as in claim 6, wherein said microprocessor has a cache memory, said processing unit, an internal data bus for data transfer between said cache memory and said processing unit, and a memory buffer for said processing unit to access said main memory, and wherein said step of providing said internal signal is accomplished by a multiplexor multiplexing between output signals of said memory buffer and signals on said internal data bus.

8. A method as in claim 7, wherein said providing step provides a bus which multiplexes data and address signals when not used for providing said internal signals.

9. An integrated circuit comprising:

a processing unit;

a plurality of pins for connection to an external circuit having a test instrument and a functional device, wherein said plurality of pins are provided with output signals for communication with said functional device;

an internal bus that carries internal bus signals;

a decoding circuit responsive to a test signal from said test instrument indicating monitoring of said internal bus signals is desired; and a bus interface that connects said internal bus to said plurality of pins, said bus interface comprising a multiplexor that selects said internal bus signals to said pins when said pins are not being provided with said output signals.

10. The integrated circuit of claim 9, wherein said integrated circuit further comprises a cache memory and wherein said internal bus connects said cache memory to said processing unit.

11. The integrated circuit of claim 10, wherein said plurality of pins are provided with said output signals irrespective of receipt of said test signal.

12. The integrated circuit of claim 11 wherein said decoding circuit receives said test signal on pins reserved from said plurality of pins for test purposes.

13. The integrated circuit of claim 11 wherein one of said control signals is an address latch enable signal having a disabled state and an enabled state wherein said address latch enable signal is disabled when said internal signals are provided on said pins.

14. The integrated circuit of claim 11 wherein one of said control signals is a clock signal and wherein said test instrument latches said internal signals on the rising edge of said clock signal.

* * * * *

UNITED STATES PATENT AND TRADEMARK OFFICE
CERTIFICATE OF CORRECTION

PATENT NO. : 5,317,711

DATED : May 31, 1994

INVENTOR(S) : Philip A. Bourekas, et al

It is certified that error appears in the above-indentified patent and that said Letters Patent is hereby corrected as shown below:

Col. 1, line 12: Delete "systems In the past" and insert --systems. In the past--;

Col. 1, line 30: Delete "FIGURE" and insert --figure--;

Col. 3, line 45: Delete "devices" and insert --device--;

Col. 3, line 51: Delete "Coprocessor 103a" and insert --Processor 103a--;

Col. 4, line 32: Delete "themain" and insert --the main--;

UNITED STATES PATENT AND TRADEMARK OFFICE
CERTIFICATE OF CORRECTION

PATENT NO. : 5,317,711
DATED : May 31, 1994
INVENTOR(S) : Philip A. Bourekas, et al It is certified that error appears in the above-indentified patent and that said Letters Patent is hereby corrected as shown below:

Col. 4, line 44, Delete "provides" and insert --provide--.

Signed and Sealed this

Sixth Day of September, 1994

Attest:

BRUCE LEHMAN

*Attesting Officer*   *Commissioner of Patents and Trademarks*